(12) United States Patent
Blondelet et al.

(10) Patent No.: US 6,467,783 B1
(45) Date of Patent: Oct. 22, 2002

(54) MOTOR VEHICLE EQUIPPED WITH A SYSTEM FOR CONTROLLING THE CAMBER OF THE WHEELS OF THE VEHICLE ON A BEND

(75) Inventors: Michel Blondelet, Le Crest; Gregore Gogu, Aubiere; Olivier Piffard, Bey; Loïc Serra, Tallende; Davy Vernier, Sainte-Marguerite, all of (FR)

(73) Assignee: Compagnie Generale des et Establissements Michelin-Michelin & Cie (FR)

( * ) Notice: Subject to any disclaimer, the term of this patent is extended or adjusted under 35 U.S.C. 154(b) by 0 days.

(21) Appl. No.: 09/617,892

(22) Filed: Jul. 17, 2000

(30) Foreign Application Priority Data

Jul. 23, 1999 (FR) .............................. 99 09594

(51) Int. Cl.⁷ .............................. B60G 3/26; B60G 21/05
(52) U.S. Cl. .............................. 280/124.106; 280/5.521; 280/124.111; 280/124.135; 280/124.138; 280/124.142
(58) Field of Search .................. 280/124.103, 124.106, 280/124.111, 124.112, 124.113, 124.135, 124.136, 124.138, 124.139, 124.142, 124.143, 5.521; B60G 3/26, 21/05

(56) References Cited

U.S. PATENT DOCUMENTS

| 2,071,577 A | | 2/1937 | Renwick et al. | |
| 2,689,747 A | | 9/1954 | Kolbe | |
| 3,137,513 A | * | 6/1964 | Marot | 280/124.103 |
| 3,497,233 A | | 2/1970 | Bolaski, Jr. | |
| 3,729,210 A | | 4/1973 | Cunningham, Jr. | |
| 4,373,743 A | * | 2/1983 | Parsons, Jr. | 280/124.138 |
| 4,515,390 A | | 5/1985 | Greenberg | |
| 4,550,926 A | * | 11/1985 | MacIsaac | 280/124.103 |
| 5,116,069 A | | 5/1992 | Miller | |
| 5,306,034 A | * | 4/1994 | Buchanan | 280/124.135 |
| 5,580,089 A | * | 12/1996 | Kolka | 280/124.103 |
| 5,821,434 A | | 10/1998 | Halliday | |
| 6,170,838 B1 | * | 1/2001 | Laurent et al. | 280/5.521 |

FOREIGN PATENT DOCUMENTS

| DE | 4029288 A1 | 3/1991 |
| DE | 4102313 A1 | 7/1992 |
| DE | 4135585 | 5/1993 |
| DE | 19608578 A1 | 9/1997 |
| DE | 19717418 | 10/1998 |
| EP | 1070609 A1 | 1/2001 |
| FR | 967710 | 11/1950 |
| FR | 1108823 | 1/1956 |
| FR | 1252770 | 12/1960 |
| FR | 2004863 | 12/1969 |
| FR | 2745757 | 9/1997 |
| GB | 434330 | 8/1935 |
| GB | 1213795 | 11/1970 |
| GB | 1526970 | 10/1978 |

OTHER PUBLICATIONS

European Patent Office, Patent Abstracts of Japan, Publication No. 60179319, dated Sep. 13, 1985, Honda Motor Co Ltd, "Suspension Apparatus For Car", Abstract.

* cited by examiner

Primary Examiner—Peter C. English
(74) Attorney, Agent, or Firm—Baker Botts LLP

(57) ABSTRACT

A motor vehicle fitted with a system for controlling the camber ($\theta$) of the wheels of the vehicle on a bend, including, for each wheel of at least one front axle and/or rear axle of the vehicle, a suspension having a pair of suspension upper and lower arms, articulated at their outboard ends to a hub carrier and attached at their inboard ends to the body of the vehicle. The lower and upper arms of each pair are articulated at their respective inboard ends to a pivot transfer lever which is, in turn, mounted on the body by an articulation, the axis of rotation of which is contained in a longitudinal and vertical plane of the vehicle, the pivot transfer lever being capable of pivoting in such a way as to incline the wheels on the appropriate side.

20 Claims, 3 Drawing Sheets

MOTOR VEHICLE EQUIPPED WITH A SYSTEM FOR CONTROLLING THE CAMBER OF THE WHEELS OF THE VEHICLE ON A BEND

BACKGROUND OF THE INVENTION

The present invention relates to a motor vehicle equipped with a system for controlling the camber of the wheels of the vehicle on a bend.

Motor vehicles are generally fitted with a spring suspension system minimizing the transmission of jolts and allowing for comfortable driving conditions. Parasitic wheel movements are caused, as the suspension travels, depending on the quality of the suspension. The position of the wheels with respect to the body and with respect to the ground can vary, according to the vehicle and according to the vehicle running conditions. In order to determine the position of the wheels of a vehicle, there have been defined the lock, which is the angle formed by the steered wheels with respect to the longitudinal axis of the vehicle when the steering wheel is turned, the toe-in (or toe-out), which is the angle of lock of the wheels in opposition directions from one another when the steering wheel is pointing in a straight line, and the camber, which is the inclination of the wheels with respect to the ground. The wheels of the vehicle are generally also allowed a certain degree of longitudinal travel in order not to detract from the comfort if the wheels slam into a pot hole, for example.

When a vehicle enters a bend, the body tends to lean toward the outside of the bend under the effect of centrifugal force, because of the presence of the suspension, and this causes body roll. At the same time, most of the weight of the vehicle is transferred onto the wheels of the vehicle on the outside of the bend. If the plane of the wheel is not correctly maintained, this additional load on the wheels on the outside of the bend will have a highly unfavorable loading effect on the tire, because the tire will then be in contact with the ground only by an outboard and reduced peripheral portion of the tread strip of the pneumatic tire and this will furthermore lead to premature tire wear.

Specifically, the wheels often incline toward the outside of the bend in a motor vehicle, unlike the situation with motorcycles in which the wheels are always inclined toward the inside of the bend. U.S. Pat. No. 4,159,128 has already proposed a vehicle suspension system equipped with a system for controlling the camber of the wheels of the vehicle on a bend and comprising, for each wheel of the vehicle front suspension, a pair of superposed suspension upper and lower arms articulated at their outboard end to a wheel support, the suspension lower arm being articulated at its inboard end to the vehicle body, while the upper arm is articulated to the upper end of a control lever, this control lever being articulated at its center to the body, and connected at its lower end to a means for controlling a steering rod for the front wheel of the vehicle. In this system, when the vehicle driver turns the steering wheel to cause the wheels to turn toward the inside of the bend, the means for controlling the steering rod causes the control lever to pivot so as to incline the wheel toward the inside of the bend.

However, in a system such as this, the inclination of the wheels can be applied only to steered wheels, and depends only on the wheel lock. It is therefore not able to take account of the centrifugal force or of the speed or of the acceleration of the vehicle.

French Patent Application Publication No. 2 745 757 proposes an assembly forming a suspended axle, comprising a pair of superposed suspension arms articulated, on the one hand, to the wheel support and, on the other hand, to the vehicle body, a damper articulated, on the one hand, to the suspension lower arm and, on the other hand, to a control lever articulated in turn on the body, the pivoting of the control lever being controlled by an actuator in order selectively to incline the vehicle wheels and body with respect to the ground.

In a more conventional and simpler way, to avoid the outboard wheels inclining toward the outside of the bend, certain vehicles have been fitted with negative camber, that is to say with wheels which are preinclined toward the inside of the vehicle, when driving in a straight line, so that on bends, the wheels on the outside of the bend at worst adopt a vertical position with respect to the ground. However, an arrangement such as this leads to excessive fatigue in the tires which, in a straight line, run on the inside of the tread strip.

SUMMARY OF THE INVENTION

The aim of the invention is to eliminate the aforementioned drawbacks and to propose a motor vehicle fitted with a system for controlling the camber of the wheels of the vehicle on a bend, which makes it possible to cause at least a slight inclination of the wheels of the vehicle toward the inside of the bend, in order to keep a good area of contact between the tires and the ground, without in any way influencing the body roll and without necessarily being slaved to the lock of the wheels of the vehicle.

To this end, the subject of the invention is a motor vehicle fitted with a system for controlling the camber of the wheels of the vehicle on a bend, comprising, for each wheel of at least one front axle and/or rear axle of the vehicle, a suspension means consisting of a pair of suspension upper and lower arms, articulated at their outboard end to a hub carrier and attached at their inboard end to the body of the vehicle, characterized in that the suspension lower and upper arms of each pair are articulated by their respective inboard end to one and the same pivot transfer lever which is, in turn, mounted on the body by an articulation, the axis of rotation of which is contained in a longitudinal and vertical plane of the vehicle, said pivot lever being capable of pivoting in such a way as to incline the wheels on the appropriate side.

Advantageously, for each pair of suspension arms, the inboard end of the suspension upper arm is articulated approximately at the upper free end of the pivot transfer lever, the inboard end of the suspension lower arm is articulated at an intermediate point on the pivot transfer lever, between its lower and upper ends, the said pivot lever being articulated to the body of the vehicle approximately at its lower end.

In a first embodiment, the two pairs of suspension arms associated respectively with the two transversely opposed wheels of one and the same, front or rear, suspension of the vehicle, are articulated to one and the same central pivot transfer lever. Of course, in this case, the suspension arms have to be long enough to reach a central, longitudinal, vertical plane of the vehicle.

In another preferred embodiment, the two pairs of suspension arms associated respectively with the two transversely opposed wheels of one and the same, front or rear, suspension of the vehicle, are articulated to two separate pivot transfer levers, said pivot levers being articulated on the body at points spaced apart in the transverse direction of the vehicle, so that the suspension is symmetric with respect to a central, vertical, longitudinal plane of the vehicle. In this case, the said pivot levers may be connected together by a connecting rod to form, with the said pivot levers and the body, an articulated parallelogram.

Advantageously, the ratio between the distance separating the lower end and the intermediate point of the pivot lever and the distance separating the upper and lower ends of the pivot lever, is chosen to be greater than a predetermined value so that the centrifugal force applied to the body of the vehicle will automatically, by reaction, cause the pivot lever to incline on the inside of the bend.

It is possible to envisage that, in the case of a front suspension, the suspension arms are connected at their outboard end to the hub carrier by a ball joint connection, a steering rod being connected to the hub carrier, and a damper connecting the body to the said suspension upper arm.

It is also possible to envisage that, in the case of a rear suspension, the suspension lower arm is connected to the hub carrier by a connection with just one axis of articulation parallel to the longitudinal direction of the vehicle, and a damper connects the suspension upper arm to the body.

Advantageously, the pivot lever is articulated with respect to the body of the vehicle in such a way that rotation of the pivot lever with respect to the body is about an instantaneous axis of pivoting separate from mechanical articulation points.

The instantaneous axis of pivoting of the pivot lever may be designed to be horizontal or alternatively inclined in order to induce a steering effect.

The instantaneous axis of pivoting of the pivot, lever may be designed to be above or below ground level, and preferably below the level of the mechanical articulation points.

In a first alternative form, the aforementioned control system comprises an elastic link with limited torsional deformation, connecting the pivot lever to the body at its aforementioned articulation, so that the said elastic link returns the pivot lever to an approximately vertical and longitudinal plane of the vehicle when the vehicle is running in a straight line, and limits the inclination of the said pivot lever with respect to the said plane, on a bend, the inclination of the pivot lever on a bend being brought about by reaction to the centrifugal force applied to the vehicle body.

In another alternative form, the aforementioned control system comprises an actuator carried by the body of the vehicle and connected to the pivot lever, the said actuator being capable of influencing the angular position of the pivot lever in a bend, it being possible for the said actuator to be slaved to the lock of the wheels, to the centrifugal force applied to the body, to the speed of the vehicle and/or to its acceleration.

The invention is also aimed at a motor vehicle equipped with a system for controlling the camber of the wheels of the vehicle on a bend, comprising, for each wheel of a front and/or rear suspension of the vehicle, a suspension means articulated, at its outboard end, to a hub carrier and borne on its inboard end by the body of the vehicle, characterized in that each suspension means is articulated to the body with a degree of freedom in rotation about an axis parallel to the longitudinal direction of the vehicle in order to vary the camber of the associated wheel, and the aforementioned control system comprises an elastic return means for urging the wheel in an approximately vertical and longitudinal plane of the vehicle when the vehicle is running in a straight line, and for limiting the inclination of the said wheel with respect to the ground in a bend, the said suspension means being designed in such a way as to cause the wheel to become inclined with respect to the ground on the inside of the bend, under the effect of the centrifugal force applied to the body. Advantageously, the aforementioned suspension means and the aforementioned control system are as defined in the vehicle described above.

In order to allow for a better understanding of the subject matter of the invention, three embodiments thereof, depicted in the appended drawings will now be described by way of purely illustrative and non limiting examples.

DESCRIPTION OF PREFERRED EMBODIMENTS

Figure 1:
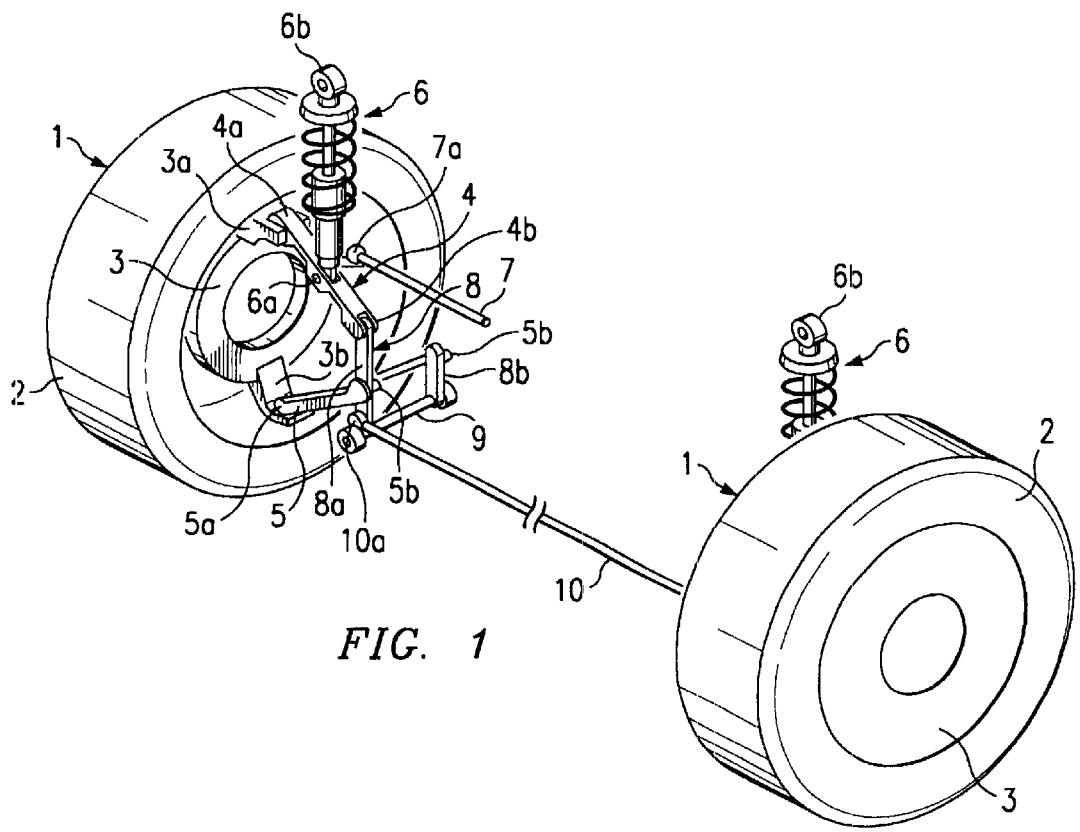
FIG. 1 is a diagrammatic partial perspective view of a front suspension of a motor vehicle according to the invention.

FIG. 1 depicts a front suspension for a motor vehicle. Each front wheel 1 consists of a pneumatic tire 2 and of a hub carrier 3 intended to carry the steering knuckle of the front axle of the vehicle. The hub carrier 3 comprises, on its inboard face, an upper lug 3a and a lower lug 3b which are diametrically opposed and capable of accommodating a ball joint for connecting them to the outboard end 4a, 5a of a suspension upper arm 4 and a suspension lower arm 5, respectively. Articulated, approximately mid-way along the suspension upper arm 4 is the lower end 6a of a damper 6, the upper end 6b of which is intended to be mounted, via a pivot connection, on the chassis C of the vehicle (depicted in FIGS. 3 and 4). The damper 6 consists, in a way known per se, of a cylinder and of a damper rod associated with a helical compression spring.

A steering rod 7 is mounted, at its outboard end 7a, via a ball joint, on the hub carrier 3, to control the lock of the wheels 1. The rod 7 is connected, by a mechanism known per se, to the steering column which is operated by the vehicle steering wheel.

The inboard end 4b of the suspension upper arm is articulated to the free upper end of a pivot transfer lever 8 which is articulated, at its lower end, to an articulation spindle 9 extending in the longitudinal direction of the vehicle on its body.

The suspension lower arm 5 is in the form of a wishbone, the vertex of the triangular shape of which constitutes the outboard end 5a mounted on the hub carrier 3, and the two ends of the base of the triangle of which are fork shaped and constitute the inboard ends 5b of the suspension lower arm, which are articulated at an intermediate point along the pivot transfer lever 8. This pivot transfer lever 8 is, in fact, formed of a first longer link rod 8a, to which the inboard end 4b of the suspension upper arm 4, an inboard branch 5b of the suspension lower wishbone 5 and the aforementioned articulation spindle 9 are articulated, and of a second, shorter, link rod 8b to which only the other branch 5b of the suspension lower wishbone 5 and the articulation spindle 9 are articulated. The pivot lever 8, the arms 4 and 5 and the hub carrier 3 together form an articulated quadrilateral.

A connecting rod 10 extends in the transverse direction of the vehicle and connects the two pivot transfer levers associated with the front left and front right wheels. The connecting rod 10 is connected to each pivot transfer lever 8 by one of its ends 10a at an intermediate point between the articulation spindle 9 and the point of articulation with the suspension lower arm 5. Thus, the two pivot transfer levers 8 and the connecting rod 10 form, with the chassis, an articulated parallelogram.

Figure 2:
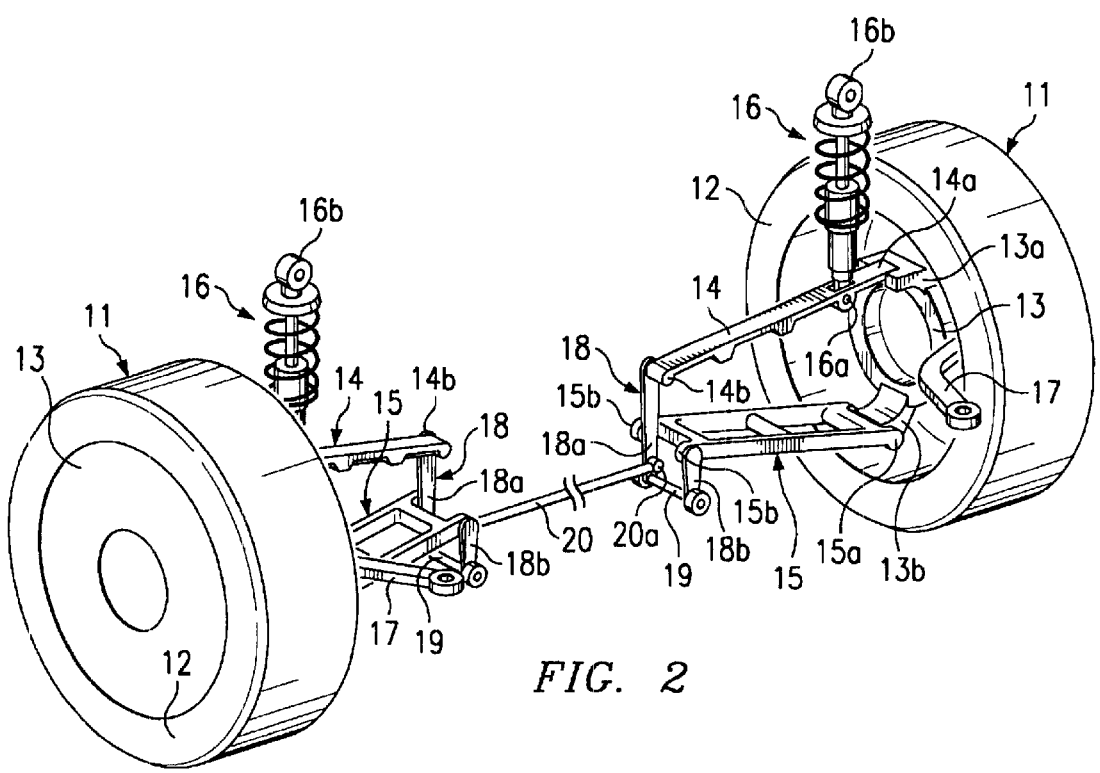
FIG. 2 is a diagrammatic partial perspective view of a rear suspension of a vehicle according to the invention.
Figure 3:
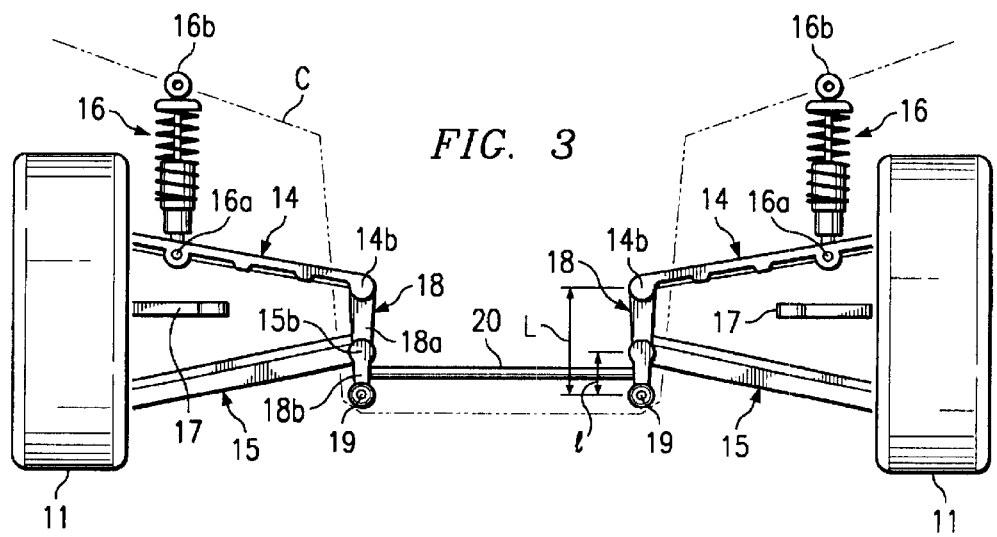
FIG. 3 is a view in front elevation of the rear suspension of FIG. 2, in a position of running in a straight line.
Figure 4:
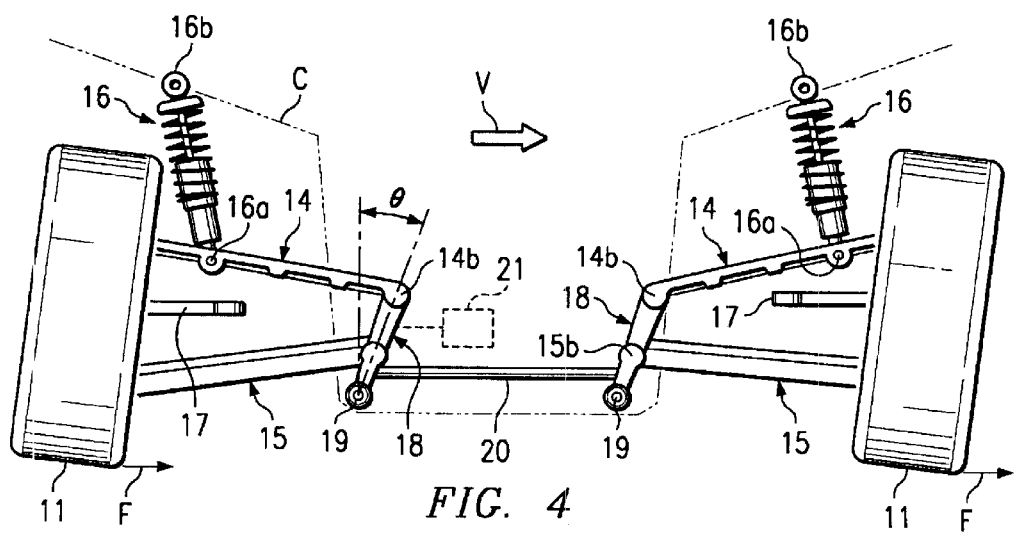
FIG. 4 is a view similar to FIG. 3, but in a bend.

FIGS. 2 to 4 depict the rear suspension, in which elements which are identical to or similar to those of the front suspension carry the same reference numerals increased by 10.

The main differences between the rear suspension and the front suspension relate to the steering rod 17 which, in this instance, is attached at its outboard end to the hub carrier 13 and, at its inboard end to the rear of the body of the vehicle, to prevent the rear wheels 11 from steering. The suspension lower arm 15 and the suspension upper arm 14 are connected to the hub carrier 13 by pivot connections with just one axis of articulation oriented in the longitudinal direction of the vehicle as best visible in FIG. 2.

Figure 5:
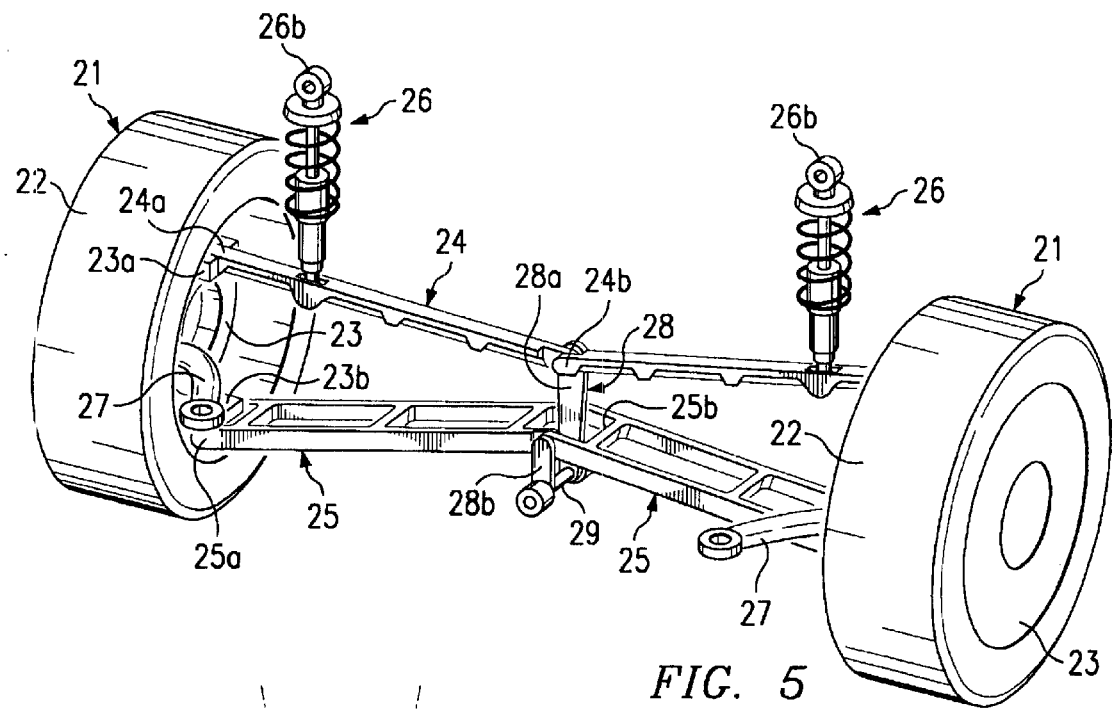
FIG. 5 is a view similar to FIG. 1, but for a rear suspension according to a third embodiment of the vehicle of the invention.

FIG. 5 depicts an alternative form of the rear suspension, in which elements which are identical or similar to those of the front suspension carry the same reference numerals increased by 20.

In this alternative form, the connecting rod 10 has been omitted and there is just one pivot lever 28 located at the center of the chassis and to which the suspension arms 24, 25 of each transversely opposed wheel are connected, the arms 24, 25 being envisaged longer for this purpose.

The way in which the invention works will now be described with reference to FIGS. 3 and 4.

Figure 3A:
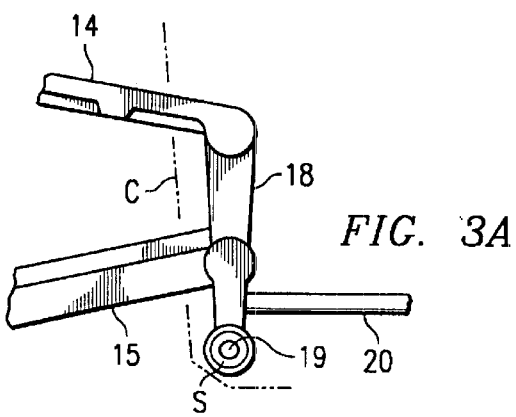
FIG. 3A is a larger scale detail of FIG. 3.

In the alternative form illustrated in FIG. 3, it is possible to envisage for the articulation spindle 19 of the pivot lever 18 to be equipped with an elastic sleeve S (see FIG. 3A) for connecting it to the body C, the said elastic sleeve being able to deform in terms of torsion so as to limit the pivoting of the pivot lever 18 with respect to the articulation spindle 19 and to return it to its approximately vertical position, when not in bends.

In this case, when the vehicle enters a bend, the weight of the body C is transferred to the outside of the bend because of the centrifugal force and the asymmetric compression of the dampers 16. In FIG. 4, the arrow V has been used to indicate the direction of the bend in which the vehicle has to turn. Given that the chassis C is carried toward the outside of the bend, the articulation spindle 19 of the pivot lever 18 is moved to the left in FIG. 4, that is to say toward the outside of the bend with respect to the wheels 11 of the vehicle. This causes the pivot lever 18 to pivot in a clockwise direction in FIG. 4 about the articulation spindle 19 by an angle θ approximately equal to 10–15°. The pivoting of the pivot lever 18 causes the suspension lower arm 15 and the upper arm 14 to move at the same time, thus causing a corresponding inclination of the wheels 11 on the inside of the bend. Of course, to cause the pivot lever 18 to pivot automatically on the inside of the bend in reaction to the centrifugal force applied to the chassis C, the values L and l have to be chosen in such a way that the ratio l/L exceeds a predetermined value, l being the distance between the articulation spindle 19 and the inboard end 15b of the suspension lower arm 15 and L being the distance between the articulation spindle 19 and the inboard end 14b of the suspension upper arm 14.

FIG. 4 depicts the wheels in an inclined position, on a bend, without depicting the body C in its true position inclined toward the outside of the bend under the effect of centrifugal force. In reality, the slight inclination of the wheels 11 of the vehicle will at least compensate for the inclination in the opposite direction of the wheels on the outside of the bend, under the effect of centrifugal force, so that the area for contact between the pneumatic tires 12 of the wheels 11 and the ground will remain sufficient. As indicated by the arrows F in FIG. 4, the force with which the wheels 11 press on the ground is oriented toward the inside of the bend, which contributes to good road holding, as is the case in motorcycles, in which the wheels exert thrust with the camber oriented toward the inside of the bend.

In another alternative, it would be possible to envisage one pivot lever 18 being controlled in terms of rotation by an actuator 21 depicted in broken line in FIG. 4, for influencing the inclination of the pivot lever 18 in a bend, on the basis of parameters detected, such as the wheel lock, the centrifugal force, the speed and/or the acceleration of the vehicle.

One of the principles of the invention consists in attaching the suspension lower and upper arms to an intermediate pivot transfer lever rather than attaching them directly to the body.

In the case of an elastic sleeve with torsional deformation, it is possible to speak of the vehicle having reactive camber control whereas, in the case of the actuator 21, the control is said to be active camber control.

In the embodiment of FIG. 5, the articulation spindle 29 of the pivot lever 28 is an instantaneous axis of pivoting of the pivot lever 28. The location of this axis with respect to the ground is limited by the ground clearance of the vehicle. Thus, the instantaneous axis of pivoting of the pivot lever 28 is always above ground level.

To optimize the position of the instantaneous axis of pivoting in terms of performance, it has been sensible to provide a pivot lever capable of pivoting about a virtual axis transferred to any desired position, particularly one below ground level.

Figure 7:
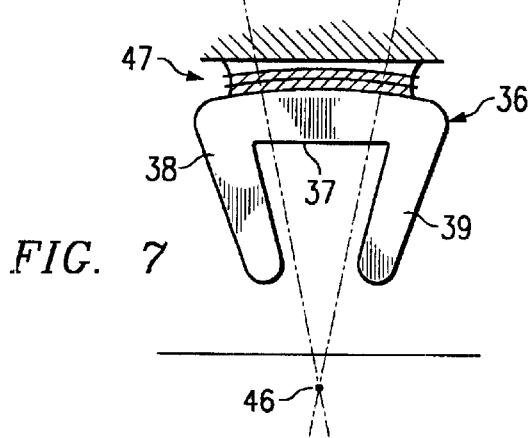
FIG. 7 is a diagrammatic view of an alternative form of FIG. 6.
Figure 6:
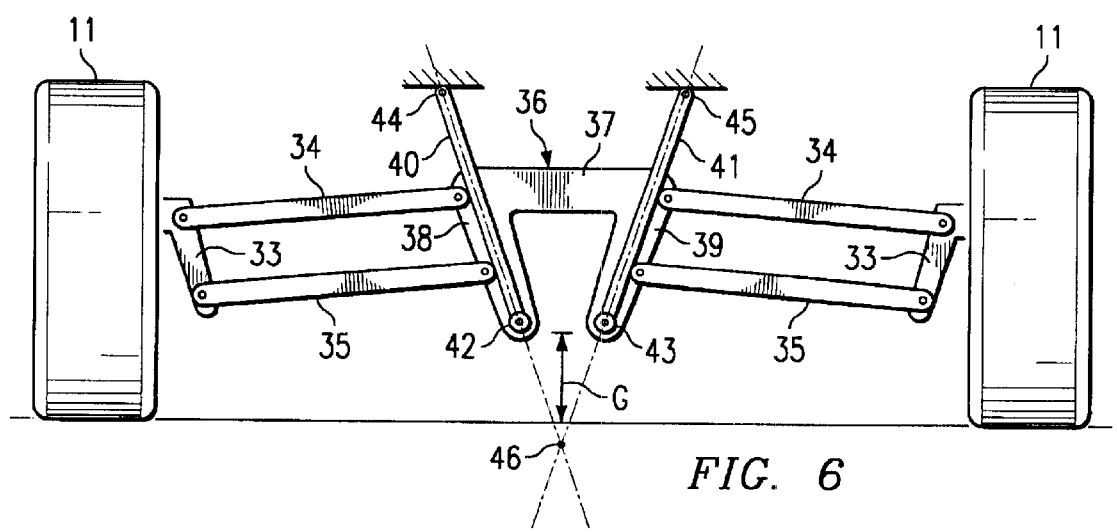
FIG. 6 is a diagrammatic view of one example of a suspension according to a fourth embodiment of the vehicle according to the invention.

Two embodiments of a pivot lever such as this are depicted diagrammatically in FIGS. 6 and 7.

In FIG. 6, each wheel 11 has a hub carrier 33 on which a suspension upper arm 34 and a suspension lower arm 35 are articulated. A U-shaped pivot lever 36 is provided, this lever having a central part 37 extending transversely with respect to the vehicle and two arms 38 and 39 extending downward, parallel to the respective hub carrier 33, and converging downward.

Each suspension upper arm 34 is articulated, on the one hand, to the upper part of the respective hub carrier 33 and, on the other hand, to the upper part of the arm 38 (or 39) of the pivot lever 36. Each suspension lower arm 35 is articulated, on the one hand, to the lower part of the respective hub carrier 33 and, on the other hand, to an intermediate point on the arm 38 (or 39) of the pivot lever. Thus, the hub carrier and the arms 34,35 and 38 (or 39) constitute articulated parallelograms.

Articulated to the lower ends 42, 43 of the arms 38, 39 of the pivot lever 36 are the rods 40, 41 respectively. The other ends 44, 45 of the rods 40, 41 are articulated to the vehicle body. The rods 40, 41 are arranged approximately parallel to the arms 38, 39 of the pivot lever 36, that is to say converging downward, at a point 46 which corresponds to the instantaneous axis of pivoting of the pivot lever 36. This instantaneous axis of pivoting can be placed above or below ground level, and preferably below the level of the mechanical articulation points.

In FIG. 7, the pivot lever 36 has the same structure as in FIG. 6, but the connection with the vehicle body is obtained via a curved sliding connection 47 made of an elastic component.

The point 46 in FIGS. 6 and 7 constitutes a kind of virtual pivot, corresponding to an instantaneous axis of pivoting separate from mechanical articulation points.

The pivot lever 36 has been described in conjunction with FIGS. 6 and 7 in a particular embodiment. It should be noted that the pivot lever can have any arbitrary shape and that only the points at which the various elements are articulated to the pivot lever are functional. The shape of the pivot lever is determined according to the constraints on space under the vehicle and to the method of assembling the suspension means to the body of the vehicle. Thus, the pivot lever may be of a closed shape or may be open, for example towards the top or towards the bottom (as is the case in FIG. 6).

The virtual axis of pivoting, symbolized by the point 46, may be horizontal or may be inclined in order, for example, to induce a steering effect when going round a bend.

Although the invention has been described in conjunction with a number of particular embodiment variations, it is quite obvious that it is not in any way restricted thereto and that it comprises all technical equivalents of the means described and combinations thereof where these fall within the scope of the invention.

We claim:

1. A motor vehicle having a system for controlling the camber of at least one pair of front or rear wheels of the vehicle running on a bend, said vehicle comprising:

a body;

front and rear axles each having a pair of hub carriers, each hub carrier carrying one wheel of said pair of front or rear wheels of the vehicle; and for each wheel of at least one of said front and rear axles, a suspension means for linking a corresponding one of said hub carriers to said body, each of said suspension means having a pair of suspension arms including an upper arm and a lower arm, each of said upper and lower arms having an outboard end articulated to said corresponding one of said hub carriers and an inboard end articulated to a pivot transfer lever, the inboard end of said upper arm being articulated at a first point of said pivot transfer lever and the inboard end of said lower arm being articulated at a second point of said pivot transfer lever located below said first point, said pivot transfer lever being mounted on said body by an articulation device defining an axis of rotation which extends in a longitudinal and vertical plane of the vehicle at a level below said second point of the pivot transfer lever, said pivot transfer lever being capable of pivoting about said axis of rotation in such a way as to incline the wheel carried by said corresponding one of said hub carriers toward a right or left side of the vehicle depending on whether the vehicle is running on a bend to the right or to the left.

2. A vehicle according to claim 1, wherein said pivot transfer lever has an upper free end and a lower end, and wherein the inboard end of said upper arm is articulated approximately at the upper free end of said pivot transfer lever, the inboard end of said lower arm is articulated at an intermediate point on the pivot transfer lever, between its lower and upper ends, said pivot transfer lever being articulated to said body of the vehicle approximately at the lower end of said pivot transfer lever.

3. A vehicle according to claim 2, wherein the ratio between the distance (l) separating the lower end and the intermediate point of said pivot transfer lever and the distance (L) separating the upper and lower ends of said pivot transfer lever, is chosen so that a centrifugal force applied to said body of the vehicle will automatically, by reaction, cause said pivot transfer lever to incline itself toward the inside of the bend.

4. A vehicle according to claim 1, wherein two pairs of suspension arms associated respectively with two transversely opposed front or rear wheels of said front or rear axle of the vehicle are articulated to two separate pivot transfer levers, said pivot transfer levers being articulated on said body at points spaced apart in a transverse direction of the vehicle, said two pairs of suspension arms and said two separate pivot transfer levers forming a suspension which is symmetric with respect to a central, vertical, longitudinal plane of the vehicle.

5. A vehicle according to claim 4, wherein said two separate pivot transfer levers are connected together by a connecting rod to form, with said pivot transfer levers and said body, an articulated parallelogram.

6. A vehicle according to claim 1, wherein each hub carrier of said front axle is linked to said body by one said pair of suspension arms, and the suspension arms of said pair are connected at their outboard end to the corresponding hub carrier by ball joint connections, a steering rod being connected to said corresponding hub carrier, and a damper connecting said body to the upper arm of said pair of suspension arms.

7. A vehicle according to claim 1, wherein each hub carrier of said rear axle is linked to said body by one said pair of suspension arms, and the lower arm of said pair is connected to the corresponding hub carrier by a connection with just one axis of articulation parallel to a longitudinal direction of the vehicle, and a damper connects the upper arm of said pair of suspension arms to said body.

8. A vehicle according to claim 1, wherein said control system comprises an elastic link with limited torsional deformation, connecting said pivot transfer lever to said body at said articulation device, so that said elastic link returns said pivot transfer lever to an approximately vertical and longitudinal plane of the vehicle when the vehicle is running in a straight line, and limits the inclination of said pivot transfer lever with respect to said plane, when the vehicle is running on a bend, the inclination of said pivot transfer lever on a bend being brought about by reaction to a centrifugal force applied to the vehicle body.

9. A vehicle according to claim 1, wherein said control system comprises an actuator carried by said body of the vehicle and connected to said pivot transfer lever, said actuator being capable of influencing the angular position of said pivot transfer lever on a bend.

10. A vehicle according to claim 1, wherein said suspension means comprises a suspension spring means mounted between one of said suspension arms and said body of the vehicle, said suspension spring means being articulated with respect to said one suspension arm.

11. A vehicle according to claim 10, wherein said suspension spring means is articulated with respect to said body.

12. A vehicle according to claim 1, wherein two pairs of suspension arms associated respectively with two transversely opposed front or rear wheels of said front or rear axle of the vehicle are articulated to said pivot transfer lever which is common to said two pairs of suspension arms and which is located centrally between said two pairs of suspension arms.

13. A vehicle according to claim 1, wherein said pivot transfer lever is articulated with respect to said body of the vehicle in such a way that rotation of said pivot transfer lever with respect to said body is about an instantaneous axis of rotation separate from mechanical articulation points of said pivot transfer lever, said instantaneous axis of rotation of said pivot transfer lever being located below the level of said mechanical articulation points.

14. A vehicle according to claim 13, wherein said instantaneous axis of rotation of said pivot transfer lever is horizontal.

15. A vehicle according to claim 13, wherein said instantaneous axis of rotation of said pivot transfer lever is inclined in order to induce a steering effect.

16. A vehicle according to claim 13, wherein said articulation device comprises a pair of rods, each rod of said pair of rods having a lower end articulated to said pivot transfer lever and an upper end articulated to said body of the vehicle, and the two rods of said pair of rods converging downward at a point corresponding to said instantaneous axis of rotation.

17. A vehicle according to claim 1, wherein said axis of rotation, defined by said articulation device, is placed at a level below the ground.

18. A motor vehicle having a control system for controlling the camber of at least one pair of front or rear wheels of the vehicle running on a bend, said vehicle comprising:

a body;

front and rear axles each having a pair of hub carriers, each hub carrier carrying one wheel of said pair of front or rear wheels of the vehicle; and for each wheel of at least one of said front and rear axles, a suspension means for linking a corresponding one of said hub carriers to said body, said suspension means having an outboard end articulated to said corresponding one of said hub carriers and an inboard end pivotally attached to said body;

wherein each suspension means is articulated to said body with a degree of freedom in rotation about an axis parallel to a longitudinal direction of the vehicle in order to vary the camber of the associated wheel;

wherein said suspension means inclines said associated wheel with respect to ground toward the inside of the bend under effect of a centrifugal force applied to said body; and wherein each said suspension means has at least one suspension arm having an outboard end articulated to said corresponding one of said hub carriers and an inboard end articulated to a point of a pivot transfer lever, said pivot transfer lever being mounted on said body by an articulation device defining an axis of rotation which extends in a longitudinal and vertical plane of the vehicle at a level below said point of the pivot transfer lever, said pivot transfer lever being capable of pivoting about said axis of rotation in such a way as to incline the wheel carried by said corresponding one of said hub carriers toward a right or left side of the vehicle depending on the vehicle running on a right or left bend.

19. A vehicle according to claim 18, wherein said control system comprises an elastic return means for urging said associated wheel in an approximately vertical and longitudinal plane of the vehicle when said vehicle is running in a straight line, and for limiting the inclination of said associated wheel with respect to ground when the vehicle is running on a bend.

20. A vehicle according to claim 18, wherein said axis of rotation, defined by said articulation device, is placed at a level below ground level.

* * * * *